United States Patent
Gomes et al.

(10) Patent No.: US 10,954,673 B2
(45) Date of Patent: Mar. 23, 2021

(54) SOLAR-REFLECTIVE ROOFING GRANULES, ROOFING PRODUCTS INCLUDING THEM, AND METHODS FOR MAKING THEM

(71) Applicant: CertainTeed LLC, Malvern, PA (US)

(72) Inventors: David Gomes, Framingham, MA (US); Tracy H. Panzarella, Norwood, MA (US); Rachel Z. Pytel, Newton, MA (US); Colleen McDowell, Northboro, MA (US)

(73) Assignee: CertainTeed LLC, Malven, PA (US)

( * ) Notice: Subject to any disclaimer, the term of this patent is extended or adjusted under 35 U.S.C. 154(b) by 0 days.

(21) Appl. No.: 16/365,369

(22) Filed: Mar. 26, 2019

(65) Prior Publication Data
US 2019/0323240 A1 Oct. 24, 2019

Related U.S. Application Data

(60) Provisional application No. 62/651,090, filed on Mar. 31, 2018.

(51) Int. Cl.
*E04D 1/20* (2006.01)
*E04D 1/00* (2006.01)
*B01J 2/16* (2006.01)

(52) U.S. Cl.
CPC . *E04D 1/20* (2013.01); *B01J 2/16* (2013.01); *E04D 2001/005* (2013.01)

(58) Field of Classification Search
None
See application file for complete search history.

(56) References Cited

U.S. PATENT DOCUMENTS

2005/0072114 A1* 4/2005 Shiao .................. E04D 1/00 52/782.1
2006/0240224 A1 10/2006 Khan
(Continued)

FOREIGN PATENT DOCUMENTS

CN 202071423 U 12/2011
WO 2014042987 A2 3/2014
(Continued)

*Primary Examiner* — Chinessa T. Golden
(74) *Attorney, Agent, or Firm* — McDonnell Boehnen Hulbert & Berghoff LLP

(57) ABSTRACT

Provided are roofing granules, such as solar-reflective roofing granules, methods for making them and their use in roofing products. In one aspect, the disclosure provides a collection of solar-reflective roofing granules having a solar reflectivity of at least 70%, wherein substantially each roofing granule comprises an inner layer, an outer layer disposed on an outer surface of the inner layer and substantially surrounding the inner layer, wherein the inner layer and the outer layer are formed from substantially the same composition but have substantially different porosities, the outer layer having a porosity substantially lower than the porosity of the outer layer. Methods for making such roofing granules can include forming layers of substantially the same first and second compositions, wherein the forming of the layer of the second composition is performed under substantially different conditions from the forming of the layer of the first composition.

23 Claims, 2 Drawing Sheets

(56) References Cited

U.S. PATENT DOCUMENTS

2008/0241472 A1    10/2008  Shiao
2010/0139194 A1     6/2010  Burns
2011/0223385 A1*    9/2011  Shiao .................. E04D 1/22
                                                      428/144
2015/0192698 A1     7/2015  Joedicke
2015/0266774 A1     9/2015  Budd

FOREIGN PATENT DOCUMENTS

WO      2014042988  A2    3/2014
WO      2014043212  A2    3/2014

* cited by examiner

SOLAR-REFLECTIVE ROOFING GRANULES, ROOFING PRODUCTS INCLUDING THEM, AND METHODS FOR MAKING THEM

CROSS-REFERENCE TO RELATED APPLICATIONS

This application claims the benefit of priority of U.S. Provisional Patent Application No. 62/651,090, filed Mar. 31, 2018, which is hereby incorporated herein by reference in its entirety.

BACKGROUND OF THE DISCLOSURE

1. Field of the Disclosure

The present disclosure relates generally to roofing products. The present disclosure relates more particularly to roofing granules, such as solar-reflective roofing granules, and to methods for making them and their use in roofing products.

2. Technical Background

Sized mineral rocks are commonly used as granules in roofing applications to provide protective functions to the asphalt shingles. Roofing granules are generally used in asphalt shingles or in roofing membranes to protect asphalt from harmful ultraviolet radiation. Roofing granules typically comprise crushed and screened mineral materials, which can be coated subsequently with a binder containing one or more coloring pigments, such as suitable metal oxides. The granules are employed to provide a protective layer on asphaltic roofing materials such as shingles, and to add aesthetic values to a roof.

Depending on location and climate, shingled roofs can experience very challenging environmental conditions, which tend to reduce the effective service life of such roofs. One significant environmental stress is the elevated temperature to which roofing shingles are subjected under sunny, summer conditions.

Mineral-surfaced asphalt shingles, such as those described in ASTM D0225 or D03462, are generally used in steep-sloped roofs to enhance the water-shedding function while adding aesthetically pleasing appearance to the roofs. The asphalt shingles are generally constructed from asphalt-saturated roofing felts and surfaced by pigmented color granules, such as those described in U.S. Pat. No. 4,717,614. Asphalt shingles coated with conventional roofing granules are known to have low solar heat reflectivity, and hence will absorb solar heat, especially through the near infrared range (700 nm-2500 nm) of the solar spectrum. This phenomenon is increased as the granules covering the surface become dark in color. For example, while white-colored asphalt shingles can have solar reflectivity in the range of 25-35%, dark-colored asphalt shingles can have solar reflectivity of only 5-15%. Furthermore, except in the white or very light colors, there is typically only a very small amount of pigment in the color coating of the conventional granules that reflects solar radiation well. As a result, it is common to measure temperatures as high as 77° C. on the surface of black roofing shingles on a sunny day with 21° C. ambient temperature. Absorption of solar heat may result in elevated temperatures at the shingle's surroundings, which can contribute to the so-called "urban heat-island effect" and increase the cooling load to its surroundings. This not only increases the demand for indoor cooling energy, but also contributes to smog formation due to higher surface temperatures. Hence, it is beneficial to have a surface with increased solar reflectivity, such as greater than 70 percent, to reduce solar heat gain, thereby reducing the heat flux entering the building envelope or reducing surface temperatures for lowering smog formation. It is therefore advantageous to have roofing shingles that have high solar reflectivity.

The surface reflectivity of an asphalt shingle or roofing membrane largely depends on the solar reflectivity of the granules that are used to cover the bitumen. Typically, roofing granules are applied such that about 95 to 97 percent of the shingle surface is effectively covered by the granules.

The state of California has implemented a building code requiring the low-sloped roofs to have roof coverings with solar reflectivity greater than 70%. However, colored roofing granules, prepared using current coloring technology, are not generally capable of achieving such a high level of solar reflectivity. Thus, in order to reduce solar heat absorption, it has been suggested to apply coatings externally directly onto the shingled surface of roofs. White pigment-containing latex coatings have been proposed and evaluated by various manufacturers. However, the polymeric coating applied has only limited amount of service life and requires re-coat after certain years of service. Also, the cost of adding such a coating on roof coverings can be relatively high. Other manufactures have also proposed the use of exterior-grade coatings that were colored by IR-reflective pigments for deep-tone colors and sprayed onto the roof in the field.

Solar control films that contain either a thin layer of metal/metal oxides, or dielectric layers applied through vacuum deposition, have been commercially available for use in architectural glasses.

Many materials have been proposed for use in protecting roofing from solar heat radiation, such as ceramic grog, recycled porcelain, and white plastic chips. However, the previously proposed materials have limited use, and cannot satisfy all requirements for roofing materials. There is a continuing need for roofing materials, and especially asphalt shingles, that have improved resistance to thermal stresses. In particular, there is a need for roofing granules that provide increased solar heat reflectivity to reduce the solar absorption of the shingle. Hence, it would be advantageous to have roofing granules that have solar reflectivities greater than 70%.

SUMMARY OF THE DISCLOSURE

In one aspect, the present disclosure provides a collection of solar-reflective roofing granules having a solar reflectivity of at least 70%, wherein substantially each roofing granule comprises an inner layer, an outer layer disposed on an outer surface of the inner layer and substantially surrounding the inner layer, wherein the inner layer and the outer layer are formed from substantially the same composition but have substantially different porosities, the outer layer having a porosity substantially lower than the porosity of the inner layer.

In another aspect, the present disclosure provides a roofing product comprising a substrate; a bituminous material coated on the substrate, the bituminous material having a top surface; and the collection of solar-reflective roofing granules as described herein disposed on the top surface of the bituminous material, thereby substantially coating the bituminous material in a region thereof.

In another aspect, the present disclosure providesA method for making a collection of solar-reflective roofing granules as described herein, the method comprising, for substantially each roofing granule, forming a layer of a first composition; and forming a layer of a second composition disposed on an outer surface of and substantially surrounding the layer of the first composition, wherein the second composition is substantially the same composition as the first composition, and wherein the forming of the layer of the second composition is performed under substantially different conditions from the forming of the layer of the first composition.

Additional aspects of the disclosure will be evident from the disclosure herein.

BRIEF DESCRIPTION OF THE DRAWINGS

The accompanying drawings are included to provide a further understanding of the methods and devices of the disclosure, and are incorporated in and constitute a part of this specification. The drawings are not necessarily to scale, and sizes of various elements may be distorted for clarity. The drawings illustrate one or more embodiment(s) of the disclosure, and together with the description serve to explain the principles and operation of the disclosure.

DETAILED DESCRIPTION

The present inventors have noted that, while solar-reflective coatings and materials used in roofing granules can provide a relatively good solar reflectivity to a roofing product bearing them, additional improvements are necessary. The present inventors have noted that, while increased porosity of a solar-reflective roofing granule can improve its overall reflectivity, it can have undesirable effects on granule strength and staining. The present inventors have also noted that it is possible to provide coatings of different materials on porous solar-reflective granules, but that this requires management of two substantially different coating compositions and the processing complications associated therewith.

The present inventors have determined that the substantially the same material can be used as a more porous inner layer and a less porous outer layer of a solar-reflective roofing granule, with the porous inner layer providing high solar reflectivity and the less porous outer layer providing improved strength and staining. The present inventors have also noted a number of convenient manufacturing methods for making such solar-reflective roofing granules.

Accordingly, one aspect of the disclosure is a collection of solar-reflective roofing granules having a solar reflectivity of at least 70%. In substantially each roofing granule, the solar-reflective roofing granules have an inner layer, an outer layer disposed on an outer surface of the inner layer and substantially surrounding the inner layer. The inner layer and the outer layer are formed from substantially the same composition but have substantially different porosities, the outer layer having a porosity substantially lower than the outer layer.

As used herein, "in substantially each roofing granule" or "the solar-reflective roofing granules of the collection substantially comprise" means that there may be a very minor number of granules (e.g., less than 2% or even less than 1%) of the collection do not meet the parameter referred to, as long as that number of granules does not substantially affect the overall performance of the collection of roofing granules. All properties described herein are understood to apply to "substantially each roofing granule," unless otherwise made clear by the text.

Figure 1:
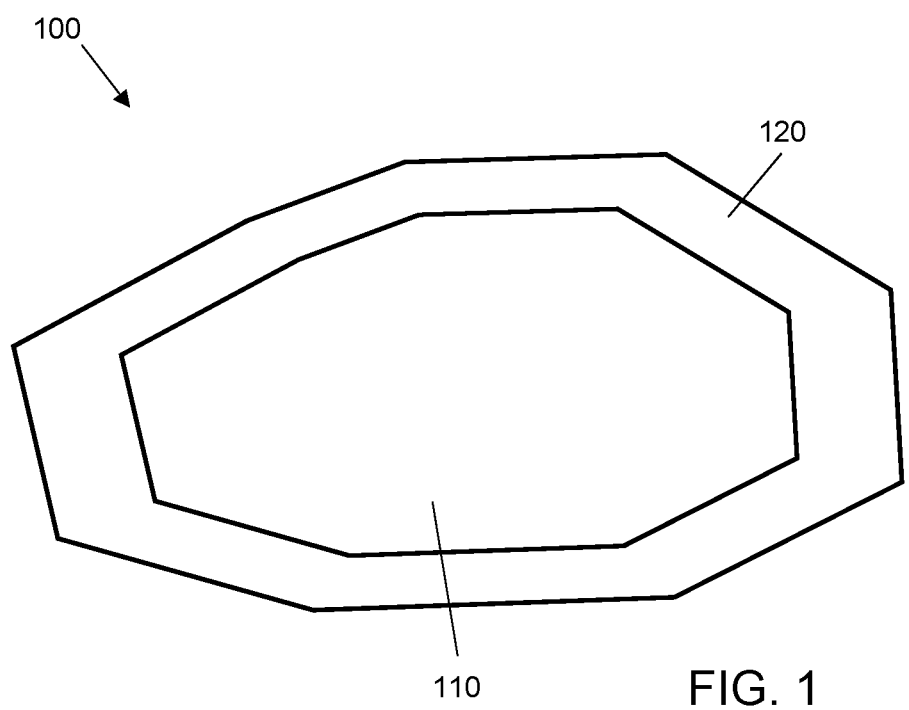
FIG. 1 is a schematic cross-sectional view of a roofing granule according to one embodiment of the disclosure.

A schematic cross-sectional view of such a roofing granule is shown in FIG. 1. Roofing granule 100 has an inner layer 110 having an outer surface 112. Disposed on the outer surface of the inner layer and substantially surrounding the inner layer is an outer layer 120. Notably, the inner layer and the outer layer are formed from substantially the same composition. And the outer layer and the inner layer have substantially different porosities, with the outer layer having a porosity that is substantially lower than that of the outer layer.

As used herein, "substantially same" compositions are compositions that have substantially the same chemical makeup. There can be minor differences among "substantially same" compositions, e.g., in color, the presence of additives, or rheological properties. In certain embodiments, "substantially same" compositions include the same solar-reflective pigments.

In certain embodiments as otherwise described herein, in substantially each roofing granule the composition of the outer layer is at least 95% common with the composition of the inner layer, i.e., the chemical makeup of the composition of the outer layer has no more than 5% difference from the chemical composition of the inner layer. In certain such embodiments, in substantially each roofing granule the composition of the outer layer is at least 98%, at least 99% common, or even at least 99.5% common with the composition of the inner layer. The person of ordinary skill in the art can provide such substantially same compositions by forming the layers from substantially the same base composition, as described in more detail below.

The porosity of the inner layer can be selected by the person of ordinary skill in the art based on the present disclosure to provide the roofing granules with a desirably high reflectivity. For example, in certain embodiments, in substantially each roofing granule the porosity of the inner layer is in the range of at least 10%. For example, in certain embodiments, in substantially each roofing granule the porosity of the inner layer is at least 20%, or even at least 30%. In certain embodiments, the porosity is in the range of 10-50% or 20-50%.] Porosity is measured by mercury intrusion porosimetry (i.e., of the material of the inner layer).

The porosity of the outer layer can be selected by the person of ordinary skill in the art based on the present disclosure to provide the roofing granules with a desirably high strength and/or a desirably high resistance to staining. For example, in certain embodiments, in substantially each roofing granule the porosity of the outer layer is less than 15%, for example, less than 10%, less than 5% or even less than 2%.

As described above, the porosity of the outer layer is substantially lower than the porosity of the inner layer. Despite being made of substantially the same composition, the inner layer and the outer layer can be formed with different porosities using; for example; the methods described herein. In certain embodiments as otherwise described herein, in substantially each roofing granule the porosity of the outer layer is no more than 50% of the porosity of the inner layer. In certain such embodiments, in substantially each roofing granule the porosity of the outer layer is no more than 50%, no more than 25%, or even no more than 10% of the porosity of the inner layer.

The thickness of the inner layer can be selected based on the present disclosure to provide sufficient optical path length to provide the desired degree of scattering and thus the desired degree of reflectivity to the overall granule. In certain embodiments, e.g., when the inner layer is configured as a granule core, in substantially each roofing granule the thickness of the inner layer is at least 250 microns, e.g., at least 500 microns, or at least 1 mm. In certain such embodiments, in substantially each roofing granule the thickness of the inner layer is no more than 10 mm, e.g., no more than 5 mm or even no more than 2 mm.

In certain embodiments, e.g., when the inner layer is formed as a coating on a base particle, in substantially each roofing granule the thickness of the inner layer is at least 20 microns, e.g., at least 40 microns. In certain such embodiments, in substantially each roofing granule the thickness of the inner layer is no more than 200 microns, e.g., no more than 150 microns or even no more than 100 microns.

The thickness of the outer layer can be selected based on the present disclosure to provide the desired strength to the overall granule. In certain embodiments, in substantially each roofing granule the thickness of the outer layer is at least 5 microns, e.g., at least 10 microns. In certain such embodiments, in substantially each roofing granule the thickness of the outer layer is no more than 100 microns, e.g., no more than 50 microns.

For the outer layer and for an inner layer formed as a coating on a base particle, thicknesses are measured as an average thickness over the surface of the granule. Thickness of an inner layer formed as a granule core (i.e., as in FIG. 1) is measured as the arithmetical mean of the longest dimension of the inner layer (defining a first axis), the longest dimension of the inner layer in a direction perpendicular to the first axis (defining a second axis) and the longest dimension of the inner layer along a third axis perpendicular to the first and second axes.

In certain desirable embodiments, in substantially each roofing granule the outer layer is a discrete layer from the inner layer, having a discrete boundary therebetween. That is, the porosity of the material of the granule changes substantially discontinuously between the value of the inner layer and the value of the outer layer, e.g., over a length scale of 5 microns or less.

Figure 2:
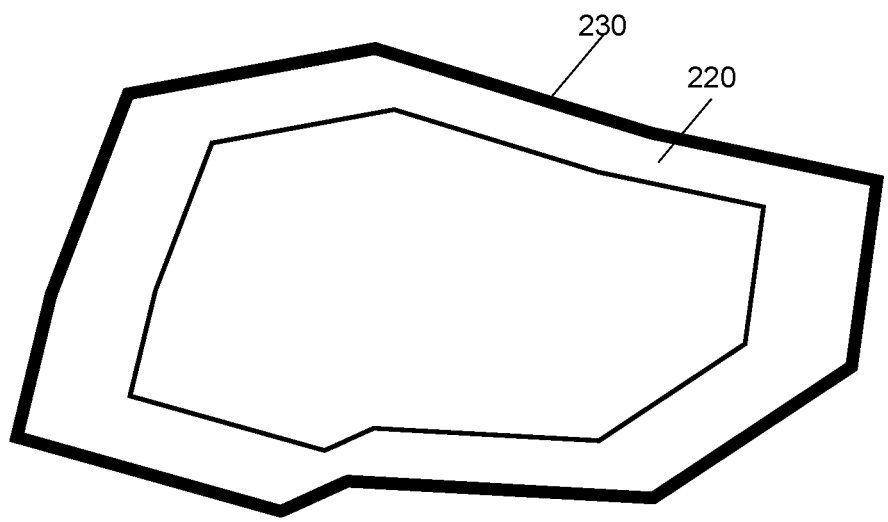
FIG. 2 is a schematic cross-sectional view of a roofing granule according to another embodiment of the disclosure.

In certain embodiments as otherwise described herein, in substantially each roofing granule the outer layer forms the outermost layer of the roofing granule, e.g., as shown in FIG. 1. In other embodiments, e.g., as shown in FIG. 2, a thin coating 230 is formed on the outer surface of the outer layer 220. Such coatings can be, e.g., formed of an organic or silicone-based material. Thicknesses are typically no more than 20 microns.

The person of ordinary skill in the art will appreciate that the solar-reflective roofing granules can be provided in a wide variety of sizes. For example, in certain embodiments as otherwise described herein, at least 90% of the solar-reflective roofing granules of the collection have a particle size in the range of #5 US mesh to #50 US mesh.

The roofing granules as described herein can advantageously have very high solar reflectivity values. As described above, the collection of solar-reflective roofing granules of has a solar reflectivity of at least 70%. In certain such embodiments, the roofing granules as otherwise described herein have a solar reflectivity of at least 75%, at least 80%, or even at least 85%. Solar reflectivity of granules is measured of the granules disposed on a flat surface (e.g., in a petri dish) packed to provide a flat surface (i.e., so that only granules are visible from above) using a solar reflectometer pursuant to ASTM C1549.

While in some embodiments the granules have some color, in order to achieve high solar reflectivity, in one presently preferred embodiment, the materials of the granule are selected such that the solar-reflective granules are white in color. In certain embodiments, the collection of solar-reflective granules of the collection has a $(a^{*2}+b^{*2})^{1/2}$ less than 10, e.g., less than 6, or even less than 2.5. In certain embodiments the collection of solar-reflective granules has an $L^*$ of at least 75, more preferably at least 80, still more preferably at least 85, and even more preferably at least 90.

Figure 3:
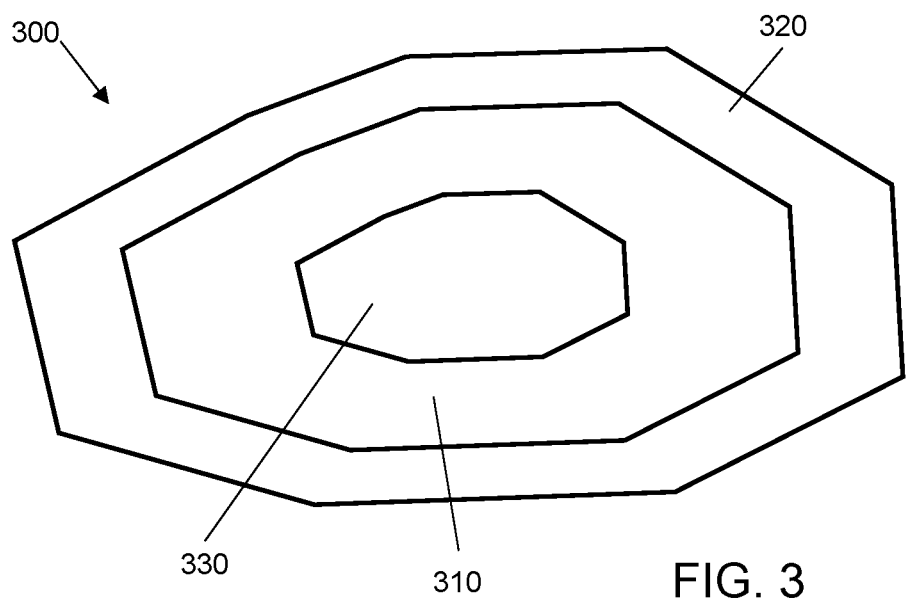
FIG. 3 is a schematic cross-sectional view of a roofing granule according to another embodiment of the disclosure.

In certain embodiments as otherwise described herein, the solar-reflective roofing granules of the collection substantially comprise a base particle having the inner layer disposed thereon, and the outer layer disposed on the outer surface of and surrounding the inner layer. Such an embodiment is shown in the schematic cross-sectional view of FIG. 3. Base particle 330 has an inner layer 310 disposed thereon, with outer layer 320 disposed on the outer surface of and surrounding the inner layer. Thus, the base particle can be used as a seed for the deposition of the inner layer, and in some embodiments can provide a significant amount of bulk to the granule.

The person of ordinary skill in the art will appreciate that a variety of materials can be used as base particles. Examples of the suitable base particles include crushed slate, slate granules, shale granules, granule chips, mica granules and metal flakes.

In other embodiments, the base particle is a synthetic particle. A variety of methods can be used to make particles suitable for use as base particles, e.g., from clays and other preceramic materials. Examples of such materials include those described, for example; in U.S. Pat. No. 7,811,730, U.S. Patent Applications Publications nos. 20100151199 and 20100203336, and U.S. Provisional Patent Application No. 62/610,991, each of which is hereby incorporated herein by reference in its entirety. For example; the base particles can be formed by forming a preceramic material in desired shapes, then firing that formed material to provide base particles. The preceramic material can be, for example, a mixture of particulate material with a suitable binder, such as the binders otherwise described herein. A wide variety of particulate materials can be used, e.g., stone dust, granule fines, can be used. In other embodiments, a clay such as bauxite or kaolin can be used as the preceramic material. Extrusion, casting or like process can in some embodiments be used to provide base particles having the sizes and aspect ratios. Examples of processes for providing base particles having a predetermined desired shape are given by U.S. Pat. No. 7,811,630 incorporated herein by reference.

In other embodiments, the solar-reflective roofing granules of the collection substantially comprise the inner layer as a granule core, and the outer layer disposed as a coating on the inner layer. This is as shown in FIG. 1, with the inner layer 110 being a granule core and the outer layer 120 being a coating disposed thereon.

The person of ordinary skill in the art will appreciate that there are a wide variety of materials, including substantially inorganic materials, that can be used as the compositions of the inner layer and of the outer layer.

As the person of ordinary skill will appreciate, a variety of materials can be used as solar-reflective pigments in the compositions for use herein. Examples of clays that can be used include kaolin, other aluminosilicate clays, Dover clay, bentonite clay, etc. Titanium dioxides such as rutile titanium dioxide and anatase titanium dioxide, metal pigments, titanates, and mirrorized silica pigments can also be used. Other solar-reflective pigments that can be adapted for use include calcium carbonate, zinc oxide, lithopone, zinc sulfide, white lead, and organic and inorganic opacifiers such as glass spheres. Of course, materials can be used in combination to provide desirable solar reflectivities and desirable mechanical properties to the granules.

Examples of mirrorized silica pigments that can be used in the compositions for use herein include pigments such as Chrom Brite CB4500, available from Bead Brite, 400 Oser Ave, Suite 600; Hauppauge; N.Y. 11788.

An example of a rutile titanium dioxide that can be employed in the compositions for use herein includes R-101, available from Du Pont de Nemours, P.O. Box 8070, Wilmington, Del. 19880.

Examples of metal pigments that can be employed in the compositions for use herein include aluminum flake pigment, copper flake pigments; copper alloy flake pigments, and the like. Metal pigments are available, for example, from ECKART America Corporation, Painesville, Ohio 44077. Suitable aluminum flake pigments include water-dispersible lamellar aluminum powders such as Eckart RO-100, RO-200, RO-300, RO-400, RO-500 and RO-600, non-leafing silica coated aluminum flake powders such as Eckart STANDART PCR 212, PCR 214, PCR 501, PCR 801, and PCR 901, and STANDART Resist 211, STANDART Resist 212, STANDART Resist 214, STANDART Resist 501 and STANDART Resist 80; silica-coated oxidation-resistant gold bronze pigments based on copper or copper-zinc alloys such as Eckart DOROLAN 08/0 Pale Gold, DOROLAN 08/0 Rich Gold and DOROLAN 10/0 Copper.

Examples of titanates that can be employed in the compositions for use herein include titanate pigments such as colored rutile, priderite, and pseudobrookite structured pigments, including titanate pigments comprising a solid solution of a dopant phase in a rutile lattice such as nickel titanium yellow, chromium titanium buff, and manganese titanium brown pigments, priderite pigments such as barium nickel titanium pigment; and pseudobrookite pigments such as iron titanium brown, and iron aluminum brown. The preparation and properties of titanate pigments are discussed in Hugh M. Smith, High Performance Pigments, Wiley-VCH, pp. 53-74 (2002).

Examples of near IR-reflective pigments available from the Shepherd Color Company, Cincinnati, Ohio, include Arctic Black 100909 (chromium green-black), Black 411 (chromium iron oxide), Brown 12 (zinc iron chromite), Brown 8 (iron titanium brown spinel), and Yellow 193 (chrome antimony titanium).

Aluminum oxide, preferably in powdered form, can be used as a solar-reflective additive in a colored formulation to improve the solar reflectivity of colored roofing granules without affecting the color. The aluminum oxide should have particle size less than #40 mesh (425 micrometers), preferably between 0.1 micrometers and 5 micrometers. More preferably, the particle size is between 0.3 micrometers and 2 micrometers. The alumina should have a percentage of aluminum oxide greater than 90 percent, more preferably greater than 95 percent. Preferably the alumina is incorporated into the granule so that it is concentrated near and/or at the outer surface of the granule.

A colored, infrared-reflective pigment can also be employed in the compositions for use herein. Preferably, the colored, infrared-reflective pigment comprises a solid solution including iron oxide, such as disclosed in U.S. Pat. No. 6,174,360, incorporated herein by reference. The colored infrared-reflective pigment can also comprise a near infrared-reflecting composite pigment such as disclosed in U.S. Pat. No. 6,521,038, incorporated herein by reference. Composite pigments are composed of a near-infrared non-absorbing colorant of a chromatic or black color and a white pigment coated with the near-infrared non-absorbing colorant. Near-infrared non-absorbing colorants that can be used include organic pigments such as organic pigments including azo, anthraquinone, phthalocyanine, perinoneiperylene, indigo/thioindigo, dioxazine, quinacridone, isoindolinone, isoindoline, diketopyrrolopyrrole, azomethine, and azomethine-azo functional groups. Preferred black organic pigments include organic pigments having azo, azomethine, and perylene functional groups. When organic colorants are employed, a low temperature cure process is preferred to avoid thermal degradation of the organic colorants.

Compostions compositions for use herein can include a binder together with one or more pigments, additionally with, for example, one or more functional fillers and/or functional additives for improved processing, to improve dispersion of pigments, to space out pigments for optimal scattering, to enhance fire resistance, to provide algae resistance, etc.

Preferably, the compositions for use herein are suitable for roofing applications. Coating materials which provide coatings with very good outdoor durability are preferred. It is also preferred that the coating material employed provide a coating with excellent fire resistance.

Examples of binders that can be used in the compositions for use herein include metal silicates, fluoropolymers, metal phosphates, silica coatings, sol-gel coatings, polysiloxanes, silicone coating, polyurethane coating, polyacrylates, or their combinations.

Compositions for use herein can include inorganic binders such as ceramic binders, and binders formed from silicates, silica, zirconates, titanates, phosphate compounds, et al. For example, the compositions can include sodium silicate and/or kaolin clay.

Organic binders can also be employed in the compositions for use herein. The use of suitable organic binders, when cured can also provide superior granule surface with enhanced granule adhesion to the asphalt substrate and with better staining resistance to asphaltic materials. Roofing granules including inorganic binders often require additional surface treatments to impart certain water repellency for granule adhesion and staining resistance. U.S. Pat. No. 5,240,760 discloses examples of polysiloxane-treated roofing granules that provide enhanced water repellency and staining resistance. With the organic binders, the additional surface treatments may be eliminated. Also, certain organic binders, particularly those water-based systems, can be cured by drying at much lower temperatures as compared to the inorganic binders such as metal-silicates, which often require curing at temperatures greater than about 500 degrees C. or by using a separate process to render the coating durable.

Examples of organic binders that can be employed in the compositions for use herein include acrylic polymers, alkyds and polyesters, amino resins, melamine resins, epoxy resins, phenolics, polyamides, polyurethanes, silicone resins, vinyl resins, polyols, cycloaliphatic epoxides, polysulfides, phenoxy, fluoropolymer resins. Examples of uv-curable organic binders that can be employed in the compositions for use herein include uv-curable acrylates, uv-curable polyurethanes, uv-curable cycloaliphatic epoxies, and blends of these polymers. In addition, electron beam-curable polyurethanes, acrylates and other polymers can also be used as binders. High solids, film-forming, synthetic polymer latex binders are useful in the compositions for use herein. Presently preferred polymeric materials useful as binders include uv-resistant polymeric materials, such as poly(meth)acrylate materials, including poly methyl methacrylate, copolymers of methyl methacrylate and alkyl acrylates such as ethyl acrylate and butyl acrylate, and copolymers of acrylate and methacrylate monomers with other monomers, such as styrene. Preferably, the monomer composition of the copolymer is selected to provide a hard, durable coating. If desired, the monomer mixture can include functional monomers to provide desirable properties, such as crosslinkability to the copolymers. The organic material can be dispersed or dissolved in a suitable solvent, such as coatings solvents well known in the coatings arts, and the resulting solution used to coat the granules. Alternatively, water-borne emulsified organic materials, such as acrylate emulsion polymers, can be employed to coat the granules, and the water subsequently removed to allow the emulsified organic materials of the coating composition to coalesce. When a fluidized bed coating device is used to coat the inorganic particles, the coating composition can be a 100 percent solids, hot-melt composition including a synthetic organic polymer that is heated to melt the composition before spray application.

The compositions for use herein can further include one or more functional additives, Examples of such functional additives include curing agents for the binder, pigment spacers, such as purified kaolin clays, and viscosity modifiers. The compositions for use herein can also contain biocides or algaecides for obtaining resistance to microbial discoloration.

The present inventors have determined that aluminosilicate clay-containing compositions can be especially useful as compositions for making the inner and outer layers described herein. For example, in many embodiments, a composition for use herein generally includes an aluminosilicate clay. In certain embodiments the aluminosilicate clay is in combination with one or more additives selected from a zinc source, a feldspar, nepheline syenite and sodium silicate. Firing (i.e., heating of a material to an elevated temperature) of the mixtures described herein can cause both calcination and densification to result in a fired material that is different in density and/or composition from the original preceramic. In typical embodiments, some degree of both calcination and densification (e.g., through sintering) occurs during the firing process.

In certain embodiments of the roofing granules as otherwise described herein, a composition for use herein is a fired mixture comprising an aluminosilicate clay. As used herein, a "fired mixture" is defined by the components of the mixture that is fired to form a "fired material." The fired mixture is defined on dry basis, i.e., exclusive of any water or solvent that is used to provide the fired mixture with formability. Aluminosilicate clays can be used to make highly solar-reflective roofing granules.

In certain embodiments of the roofing granules as otherwise described herein, the fired mixture further includes a feldspar, nepheline syenite, and/or a sodium silicate. Materials such as feldspars, nepheline syenite and sodium silicates can increase the flowability of a clay material by lowering of the melting point of the material and thus promoting liquefaction at a given firing temperature, and as such can allow for a decreased porosity.

In certain embodiments of the roofing granules as otherwise described herein, the fired mixture further includes a zinc source. As the person of ordinary skill in the art will appreciate, the zinc source can be converted in the firing to zinc compounds such as zinc oxide, zinc silicates, zinc aluminosilicates and zinc aluminates. As described in further detail below, the use of a zinc source can not only provide algae resistance to the roofing granule, but can also provide a decreased porosity at the mineral outer surface of the roofing granule, especially when used in combination with a feldspar, a sodium silicate and/or a nepheline syenite.

In certain embodiments of the roofing granules as otherwise described herein, the aluminosilicate clay of the fired mixture is a kaolin clay. As the person of ordinary skill in the art will appreciate, a "kaolin clay" or "kaolin" is a material comprising kaolinite, quartz and feldspar. For use in the roofing granules as described herein, it is desirable that the kaolin have a kaolinite content of at least about 80 weight percent, for example, at least about 90 weight percent, or even at least about 95 weight percent. As used herein, the amount of any feldspar, nepheline syenite and sodium silicate present in the kaolin (or other aluminosilicate clay) of a mixture to be fired is calculated as part of the kaolin (or other aluminosilicate clay) component, and not part of the feldspar, nepheline syenite or sodium silicate component.

The person of ordinary skill in the art will appreciate that a variety of types or grades of kaolin can be used. The kaolin used in the roofing granules described herein can be (or can include), for example, a kaolin crude material, including kaolin particles, oversize material, and ferruginous and/or titaniferous and/or other impurities, having particles ranging in size from submicron to greater than 20 micrometers in size. Alternatively, in certain desirable embodiments, a refined grade of kaolin clay can be employed, such as, for example, a grade of kaolin clay including mechanically delaminated kaolin particles. Further, grades of kaolin such as those coarse grades used to extend and fill paper pulp and those refined grades used to coat paper can be employed in the roofing granules as described herein. Examples of kaolins suitable for use in the roofing granules as described herein include, for example, EPK Kaolin (Edgar Materials), for example in jet-milled form; Kaobrite 90 (Thiele Kaolin); and SA-1 Kaolin (Active Minerals). Kaolins can be subjected to any of a number of conventional processes to beneficiate them, e.g., blunging, degritting, classifying, magnetically separating, flocculating, filtrating, redispersing, spray drying, pulverizing and firing:

In certain embodiments of the roofing granules as otherwise described herein, a different aluminosilicate clay can be used in combination with or instead of the kaolin. For example, in certain embodiments of the roofing granules as otherwise described herein, the aluminosilicate clay is (or includes) bauxite. In certain embodiments of the roofing granules as otherwise described herein, the aluminosilicate clay is (or includes) chamotte. In certain embodiments of the roofing granules as otherwise described herein, the aluminosilicate clay is (or includes) a white clay such as ball clay or montmorillonite. In certain embodiments of the roofing granules as otherwise described herein, the aluminosilicate clay is (or includes) a white clay such as ball clay or montmorillonite. However, in certain desirable embodiments, at least 50 wt %, e.g., at least 70 wt %, at least 80 wt %, at least 90 wt %, or even at least 95 wt % of the aluminosilicate clay is kaolin.

The person of ordinary skill in the art will, on the basis of the description provided herein, select aluminosilicate clay (s) that provide a high degree of whiteness, and thus a high degree of solar reflectivity. Two important impurities aluminosilicate clays such as kaolin are iron and titanium. Iron can create highly-colored impurities, especially upon firing and especially when present in combination with titanium. Accordingly, in certain desirable embodiments of the roofing granules as otherwise described herein, the aluminosilicate clay of the fired mixture has no more than 1 wt % iron, e.g. no more than 0.7 wt % or no more than 0.5 wt % iron, as measured by inductively-coupled plasma mass spectrometry (ICP-MS) and reported as $Fe_2O_3$. Similarly, in certain desirable embodiments of the roofing granules as otherwise described herein, the aluminosilicate clay of the fired mixture has no more than 1 wt % titanium, e.g., no more than 0.7 wt % no more than 0.5 wt % titanium, measured by ICP-MS and reported as $TiO_2$. The person of ordinary skill in the art can select suitable clays having low amounts of iron and titanium.

In certain embodiments of the roofing granules as otherwise described herein, the aluminosilicate clay is present in the fired mixture in an amount in the range of 40-90 wt % (i.e., exclusive of water or any solvent used to moisten the mixture for formability). For example, in various embodiments of the roofing granules as otherwise described herein, the aluminosilicate clay is present in the fired mixture in an amount in the range of 40-80 wt %, or 40-70 wt %, or 40-60 wt %, or 50-90 wt %, or 50-80 wt %, or 50-70 wt %, or 60-90 wt %, or 60-80 wt %, or 70-90 wt %. The person of ordinary skill in the art will, based on the disclosure herein, select an amount of aluminosilicate clay, e.g., in combination with other components, that provides the desired solar reflectivity and stain resistance to the roofing granules.

In certain embodiments of the roofing granules as otherwise described herein, the fired mixture includes a feldspar. As noted above, the feldspar of the fired mixture is a component separate from any kaolin or other aluminosilicate clay present, and thus the feldspar component is not said to include any feldspar present in the kaolin or other aluminosilicate clay. As noted above, the use of feldspar can lower the effective sintering temperature of the overall fired mixture, and as such can provide for a lower degree of surface porosity at a given firing temperature. As the person of ordinary skill in the art will appreciate, feldspars are aluminosilicates of sodium, potassium, calcium and/or barium. Most commonly, the feldspars are considered as solid solutions of three limiting compounds, soda feldspar, potash feldspar and lime feldspar. Accordingly, in certain embodiments of the roofing granules as otherwise described herein, the feldspar is one or more of a soda feldspar, a potash feldspar, and a lime feldspar. For example, in certain embodiments of the roofing granules as otherwise described herein, the feldspar is (or includes) a soda feldspar. In certain embodiments of the roofing granules as otherwise described herein, the feldspar is (or includes) a potash feldspar. In certain embodiments of the roofing granules as otherwise described herein, the feldspar is (or includes) a lime feldspar. MINSPAR™ 4 (Imerys) is an example of a suitable feldspar for use in the roofing granules described herein. The person of ordinary skill in the art will appreciate that other feldspars, such as plagioclase (solid solution between albite and anorthite), alkali feldspars (solid solutions between K-feldspar and albite) and barium feldspars can be suitable for use in the preparation of the mineral granules as otherwise described herein.

The person of ordinary skill in the art will, based on the disclosure herein, select an amount of a feldspar, in combination with the other component(s), that provides the desired solar reflectivity, strength and stain resistance to the roofing granules. For example, in certain embodiments of the roofing granules as otherwise described herein, the feldspar is present in the fired mixture in an amount in the range of 2-40 wt % (i.e., exclusive of water or any solvent used to moisten the mixture for formability). In various embodiments of the roofing granules as otherwise described herein, the feldspar is present in the fired mixture in an amount in the range of 2-30 wt %, or 2-25 wt %, or 2-20 wt %, or 2-15 wt %, or 2-15 wt %, or 5-40 wt %, or 5-30 wt %, or 5-25 wt %, or 5-20 wt %, or 5-15 wt %, or 10-40 wt %, or 10-30 wt %, or 10-25 wt %, or 10-20 wt %, or 15-40 wt %, or 15-30 wt %, or 15-25 wt %, or 20-40 wt %, or 20-35 wt %, or 20-30 wt %.

However, in other embodiments of the roofing granules as otherwise described herein, the fired mixture does not include a substantial amount of feldspar (i.e., separate from any feldspar in nepheline syenite that is present). For example, in certain embodiments, the fired mixture includes less than 1 wt %, less than 0.5 wt %, or even less than 0.2 wt % feldspar.

In certain embodiments of the roofing granules as otherwise described herein, the fired mixture includes a sodium silicate (e.g., in combination with, or instead of the feldspar). Like the feldspar, the sodium silicate of the fired mixture is a component separate from any kaolin or other aluminosilicate clay present, and thus the sodium silicate component is not said to include any sodium silicate present in the kaolin or other aluminosilicate clay. As noted above, the use of sodium silicate can lower the effective sintering temperature of the overall fired mixture, and as such can provide for a lower degree of surface porosity at a given firing temperature.

The person of ordinary skill in the art will, based on the disclosure herein, select an amount of a sodium silicate, in combination with the other component(s), that provides the desired solar reflectivity, strength, stain resistance and low crystalline silica content to the roofing granules. For example, in certain embodiments of the roofing granules as otherwise described herein, the sodium silicate is present in the fired mixture in an amount in the range of 5-40 wt % (i.e., exclusive of water or any solvent used to moisten the mixture for formability). In various embodiments of the roofing granules as otherwise described herein, the sodium silicate is present in the fired mixture in an amount in the range of 5-30 wt %, or 5-25 wt %, or 5-20 wt %, or 5-15 wt %, or 10-40 wt %, or 10-30 wt %, or 10-25 wt %, or 10-20 wt %, or 15-40 wt %, or 15-30 wt %, or 15-25 wt %, or 20-40 wt %, or 20-35 wt %, or 20-30 wt %. Of course, in other embodiments, substantially no separate sodium silicate component (i.e., separate from the feldspar and/or nepheline syenite) is present in the fired mixture. For example, in certain embodiments, the fired mixture includes less than 1 wt %, less than 0.5 wt %, or even less than 0.2 wt % sodium silicate.

The person of ordinary skill in the art will, based on the disclosure herein, select an amount of a nepheline syenite, in combination with the other component(s), that provides the desired solar reflectivity and low crystalline content to the roofing granules. For example, in certain embodiments of the roofing granules as otherwise described herein, the nepheline syenite is present in the fired mixture in an amount in the range of 2-40 wt % (i.e., exclusive of water or any solvent used to moisten the mixture for formability). In various embodiments of the roofing granules as otherwise described herein, the nepheline syenite is present in the fired mixture in an amount in the range of 2-30 wt %, or 2-25 wt %, or 2-20 wt %, or 2-15 wt %, or 2-15 wt %, or 5-40 wt %, or 5-30 wt %, or 5-25 wt %, or 5-20 wt %, or 5-15 wt %, or 10-40 wt %, or 10-30 wt %, 0110-25 wt %, 0110-20 wt %, 0115-40 wt %, or 15-30 wt %, or 15-25 wt %, or 20-40 wt %, or 20-35 wt %, or 20-30 wt %. In certain embodiments, when the fired mixture includes the nepheline syenite, it does not include a substantial amount of feldspar. And in certain embodiments, when the fired mixture includes the nepheline syenite, it does not include a substantial amount of sodium silicate.

However, in other embodiments of the roofing granules as otherwise described herein, the fired mixture does not include a substantial amount of nepheline syenite. For example, in certain embodiments, the fired mixture includes less than 1 wt %, less than 0.5 wt %, or even less than 0.2 wt % nepheline syenite.

In certain embodiments of the roofing granules as otherwise described herein, the fired mixture includes a zinc source. As the person of ordinary skill in the art will appreciate, the zinc source can be substantially any zinc compound that, when fired together with an aluminosilicate source provides inorganic zinc, e.g., in the form of one or more of a zinc oxide, a zinc silicate, a zinc aluminosilicate and a zinc aluminate. For example, in certain embodiments of the roofing granules as otherwise described herein, the zinc source is (or includes) zinc oxide. In certain embodiments of the roofing granules as otherwise described herein, the zinc source is (or includes) one or more of zinc oxide, zinc sulfide, zinc sulfate, zinc borate, a zinc silicate, a zinc aluminate, or a zinc aluminosilicate. Advantageously, the inventors have surprisingly found that the use of a zinc source can surprisingly provide a lower porosity to a fired material at a given firing temperature, especially when used in combination with a feldspar, a nepheline syenite and/or a sodium silicate. The use of a zinc source can also provide a roofing granule with algae resistance, and can also provide increased whiteness to the fired material overall.

The person of ordinary skill in the art will, based on the disclosure herein, select an amount of a zinc source, in combination with the other component(s), that provides the desired solar reflectivity and stain resistance to the roofing granules. For example, in certain embodiments of the roofing granules as otherwise described herein, the zinc source is present in the fired mixture in an amount in the range of 1-30 wt % (i.e., exclusive of water or any solvent used to moisten the mixture for formability). In various embodiments of the roofing granules as otherwise described herein, the sodium silicate is present in the fired mixture in an amount in the range of 1-25 wt %, or 1-20 wt %, or 1-15 wt %, or 5-30 wt %, or 5-25 wt %, or 5-20 wt %, or 15-30 wt %, or 10-25 wt %, 0115-30 wt %. The zinc source can be provided in a variety of particle sizes. In certain embodiments, the particle size (median) of the zinc source (e.g., ZnO) can be in the range of 50-500 nm, e.g., 100-500 nm, 50-250 nm, or 100-200 nm.

The zinc source can in some cases be transformed during firing to one or more different zinc compounds. The person of ordinary skill in the art will appreciate that the zinc makeup of the fired material will depend on, e.g., the particular composition of the zinc source used, the firing conditions (e.g., time and temperature), and the particular composition(s) of the other component(s) of the fired mixture. In certain embodiments of the roofing granules as otherwise described herein, at least 50% (e.g., at least 60%, at least 70%) of the zinc present in the fired material is present as a zinc oxide or a zinc silicate, as determined by X-ray crystallography. In other embodiments of the roofing granules as otherwise described herein, at least 50% (e.g., at least 60%, at least 70%) of the zinc present in the fired material is present as a zinc oxide, a zinc aluminate, a zinc aluminosilicate or a zinc silicate, as determined by X-ray crystallography. And in certain desirable embodiments of the roofing granules as otherwise described herein, no more than 40% (e.g., no more than 30%, no more than 20%) of the zinc present in the fired material is present as $ZnAl_2O_4$, as determined by X-ray crystallography. $ZnAl_2O_4$ is much less leachable at acidic pH than other commonly-used forms of zinc (e.g., ZnO and Zn silicate), Through selection of components in the mixtures to be fired and of firing temperatures based on the disclosure herein, the person of ordinary skill in the art can provide a desired balance of $ZnAl_2O_4$ as compared to other zinc forms, and thereby provide a desired overall rate of leaching. As demonstrated by Y. Tang et al., Environmental Technology, 36:23, 2977-2986 (2015), $ZnAl_2O_4$ tends to form at higher firing temperatures, Use of a feldspar, a nepheline syenite, or a sodium silicate together with a zinc source can be unexpectedly advantaged in that it can allow for firing at lower temperatures to provide a given level of porosity and solar reflectivity, and allow the person of ordinary skill in the art to provide material with a desirable relative amounts of $ZnAl_2O_4$ with respect to other zinc forms in an as-fired material. The person of ordinary skill in the art will, based on the description herein, select amounts of feldspar, nepheline syenite and/or sodium silicate, amounts of zinc source and firing conditions to provide the desired algae resistance in combination with a desired solar reflectivity, a desired level of crystalline silica, and a desired stain resistance.

In certain embodiments of the roofing granules as otherwise described herein, the fired material is a fired aluminosilicate material including in the range of 1-30 wt % zinc, measured on a zinc oxide basis (i.e., assuming that all zinc is in the form of ZnO). In certain such embodiments, the zinc is present in the fired material in an amount in the range of 1-25 wt %, or 1-20 wt %, or 1-15 wt %, or 5-30 wt %, or 5-25 wt %, or 5-20 wt %, or 10-30 wt %, or 10-25 wt %, or 10-30 wt %. The person of ordinary skill in the art will appreciate that the fired material can include a number of different crystalline phases. However, in certain desirable embodiments, the fired material includes less than 10 wt %, less than 5 wt %, less than 2 wt %, or even less than 1 wt % cristobalite. The inventors have noted that the use of feldspar, nepheline syenite and/or sodium silicate as described herein can allow for relatively low firing temperatures, below the temperature at which significant amounts of crystalline silica phases (especially cristabalite and quartz) can form. And, critically, the inventors have determined that even at high firing temperatures, mixtures including nepheline syenite can provide very low amounts of crystalline silica. This can allow for relatively high firing temperatures to be used to provide a low surface porosity, without creating an undesirably high amount of crystalline silica.

Granules and base particles made from the preceramic mixtures described herein can be made by forming a green granule or particle (e.g., as generally described above, and described in more detail below), then firing the green granule or particle to provide the granule or particle. The firing converts the mixture to the fired composition.

The first mixture can have the mineral components as described above (e.g., as identified and in the same amounts) with respect to the first fired mixture. Moreover, as the person of ordinary skill in the art will appreciate, the first mixture can further include one or more solvents (e.g., water, an organic solvent such as a lower alcohol). As noted above, the amount of the solvent is not used in the calculation of the amounts of the components of a such a mixture to be fired. The first mixture can also further include an organic binder. As the person of ordinary skill in the art will appreciate, a binder can improve pelletizing and other forming processes, and can help to increase the strength of the green granules. Suitable binders include, for example, a starch, a resin, a wax, a glue such as AR animal glue, gelatinized cornstarch, calcium carbonate and polyvinyl alcohol. Such a binder can be used in amounts, for example, up to 6 wt % of the first mixture, e.g., up to 3% or up to 2%.

Again, the aluminosilicate clay-containing materials described here can be used not only as a material for a roofing granule, but also in the alternative as a coating for a base particle (e.g., made of slate). Such uses are described in U.S. Provisional Patent Application No. 62/610,991, which is hereby incorporated herein by reference in its entirety.

Other solar-reflective materials can be used in the outer layer and inner layer. For example, in certain embodiments, each of the first layer and the second layer comprises sodium silicate and titanium dioxide. Other suitable materials are described, e.g., in U.S. Patent Application Publications nos. 2006/0240225, 2008/0241472, and 2015/0192698, each of which is hereby incorporated herein by reference in its entirety.

Another aspect of the disclosure is a roofing product comprising a substrate; a bituminous material coated on the substrate, the bituminous material having a top surface; and a collection of solar-reflective roofing granules as described herein disposed on the top surface of the bituminous material, thereby substantially coating the bituminous material. The roofing products of the disclosure can be configured, e.g., in the form of a roofing shingle, or in the form of a roofing membrane.

Figure 4:
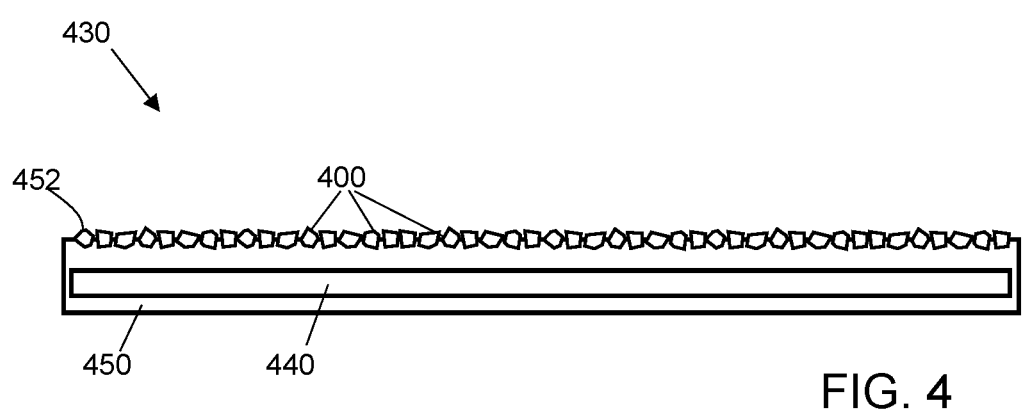
FIG. 4 is a schematic cross-sectional view of a roofing product according to one embodiment of the disclosure.

One embodiment of a such a roofing product is shown in schematic cross-sectional view in FIG. 4. In the embodiment of FIG. 4, roofing product 430 includes substrate 440, having a bituminous material 450 disposed thereon. Bituminous material 450 has top surface 452. As the person of ordinary skill in the art will appreciate, the bituminous material can be coated on both surfaces of, or even saturate the roofing substrate. A variety of materials can be used as the substrate, for example, conventional bituminous shingle or membrane substrates such as roofing felt or fiberglass. A collection of solar-reflective roofing granules 400 is disposed on the top surface 452 of the bituminous material 450, such that they substantially coat the bituminous material in a region 455 thereof. The region can be, for example, the exposure zone of a shingle, or a region that is otherwise to be exposed when the roofing product is installed on a roof. The solar-reflective roofing granules are desirably embedded somewhat in the bituminous material to provide for a high degree of adhesion. As the person of ordinary skill in the art will appreciate, other granular or particulate material can coat the bituminous material in regions that will not be exposed, e.g., on a bottom surface of the roofing product, or in a headlap zone of a top surface of the roofing product, as is conventional.

Use of the roofing granules as described herein, e.g., oriented as described herein, can provide solar-reflective roofing products with high solar reflectivity. In certain embodiments as otherwise described herein, a roofing product has a solar reflectivity of no less than 60%, e.g., no less than 62°/s or no less than 64%. And in some embodiments the roofing product has even higher reflectivity; e.g.; no less than 70% or even no less than 75%. Solar reflectivity of a roofing product is determined using a solar reflectometer pursuant to ASTM 01549.

Another aspect of the disclosure is a method for making a collection of solar-reflective roofing granules as described herein. The method includes, for substantially each roofing granule, forming a layer of a first composition; forming a layer of a second composition disposed on an outer surface of and substantially surrounding the layer of the first composition. Notably, the second composition is substantially the same composition as the first composition, but the forming of the layer of the second composition is performed under substantially different conditions from the forming of the layer of the first composition. The inventors have determined that the use of substantially different forming methods can provide substantially different porosities to the layers of the granule, even when they are made from substantially the same first and second compositions.

In certain embodiments, the first composition is at least 95% in common with the second composition. In certain such embodiments, the first composition is at least 98%, at least 99%, or even at least 99.5% in common with the second composition.

In certain embodiments, the first composition is the same as the second composition. That is, the same material feed can be used to provide the first composition and the second composition, with only the method of application of the compositions differing between the formation of the inner layer and the formation of the outer layer.

The person of ordinary skill in the art will appreciate that the first composition may require some kind of treatment (e.g., drying; firing and/or curing) to be converted to the composition of the inner layer of the granule. This can be performed, e.g., before or after disposal of the layer of the second composition thereon. Similarly; the second composition may require some kind of treatment (e.g.; drying, firing and/or curing) to be converted to the composition of the inner layer of the granule. When both the first composition and the second composition require treatment, the treatment can be performed after the disposal of the layer of the second composition on the layer of the first composition.

In one particularly desirable embodiment; the layer of the first composition is formed by fluidized bed coating. Fluidized bed coating is described in U.S. Patent Application Publication no 2006/0251807 A1; which is hereby incorporated herein by reference in its entirety. This type of coating device can be employed to provide the layers of the first composition and the second composition as precise and uniform coatings, e.g., on a base particle. Wurster-type fluidized bed spray devices are available from a number of vendors, including Glatt Air Techniques, Inc., Ramsey. N.J. 07446; Chungjin Tech. Co. Ltd., South Korea; Fluid Air Inc., Aurora, Ill. 60504, and Niro Inc., Columbia, Md. 21045. Modified Wurster-type devices and processes, such as, the Wurster-type coating device disclosed in U.S. Patent Publication 2005/0069707, incorporated herein by reference, for improving the coating of asymmetric particles, can also be employed. In addition, lining the interior surface of the coating device with abrasion-resistant materials can be employed to extend the service life of the coater.

Other types of batch process particle fluidized bed spray coating techniques and devices can be used. For example, the particles can be suspended in a fluidized bed, and the coating material can be applied tangentially to the flow of the fluidized bed, as by use of a rotary device to impart motion to the coating material droplets.

In the alternative, other types of particle fluidized bed spray coating can be employed. For example, the particles can be suspended as a fluidized bed, and coated by spray application of a coating material from above the fluidized bed. In another alternative, the particles can be suspended in a fluidized bed, and coated by spray application of a coating material from below the fluidized bed, such as is described in detail above. In either case, the coating material can be applied in either a batch process or a continuous process. In coating devices used in continuous processes, uncoated particles enter the fluidized bed and can travel through several zones, such as a preheating zone, a spray application zone, and a drying zone, before the coated particles exit the device. Further, the particles can travel through multiple zones in which different coating layers are applied as the particles travel through the corresponding coating zones.

Notably, the parameters of the fluidized bed coating process will determine the nature, extent, and thickness of the coating formed, and thus of the inner and outer layers of the. For example, the properties of a material provided in a Wurster-type fluidized bed spray device depends upon a number of parameters including the residence time of the particles in the device, the height of the Wurster tube, the particle shape, the particle size distribution, the temperature of the suspending airflow, the temperature of the fluidized bed of particles, the pressure of the suspending airflow, the pressure of the atomizing gas, the composition of the coating material, the size of the droplets of coating material, the size of the droplets of coating material relative to the size of the particles to be coated, the spreadability of the droplets of coating material on the surface of the particles to be coated, the loading of the device with the mineral particles or batch size, the viscosity of the coating material, the physical dimensions of the device, and the spray rate.

Accordingly, in certain embodiments, the layer of the first composition is formed by fluidized bed coating. In certain such embodiments, the layer of the second coating is formed fluidized bed coating under substantially different coating parameters from the formation of the layer of the first composition. Even when the first and second compositions are substantially the same as described above, the person of ordinary skill in the art can change the fluidized bed coating parameters to provide an inner layer with substantially different porosity than the outer layer. Accordingly, the layer of the second composition can be formed on the layer of the first composition in the same fluidized bed coating process, just by changing the parrameters during the coating run (e.g., without removing the materials from a coating zone of the fluidized bed coater).

In other such embodiments, the layer of the second composition is formed by a coating method other than fluidized bed coating, for example, pan coating, granulation, magnetically assisted impaction coating or spinning disc coating. For example, magnetically assisted impaction coating ("MAIC") available from Aveka Corp. Woodbury, Minn., can be used to coat granules with solid particles such as titanium dioxide. Other techniques for coating dry particles with dry materials can also be adapted for use in the present process, such as the use of a Mechanofusion device, available from Hosokawa Micron Corp., Osaka, JP; a Theta Composer device, available from Tokuj Corp., Hiratsuka, JP, and a Hybridizer device, available from Nara Machinery, Tokyo, JP. In the spinning disc method the granules and droplets of the liquid coating material are simultaneously released from the edge of a spinning disk, such as disclosed, for example, in U.S. Pat. No. 4,675,140.

Use of a method other than fluidized bed coating to form the layer of the second composition can provide substantially different porosity to the outer layer as compared to the inner layer derived from the layer of the first composition.

Of course, the person of ordinary skill in the art will appreciate that methods other than fluidized bed coating can be used to form the layer of the first composition. In certain embodiments, the layer of the first composition is formed by granulation. Granulation can be performed by the person of ordinary skill in the art to provide the inner layers of the granules with a desirable porosity. The layer of the second composition can, in some embodiments, be formed by granulation under substantially different parameters from the formation of the layer of the first composition, i.e., to provide the desired lower porosity of the second layers of the granules. In other embodiments, the layer of the second composition is formed by pan coating, spray coating, fluidized bed coating, magnetically assisted impaction coating or spinning disc coating.

In other embodiments, the layer of the first composition is formed by pan coating. Pan coating can be performed by the person of ordinary skill in the art to provide the inner layers of the granules with a desirable porosity. The layer of the second composition can, in some embodiments, be formed by pan coating under substantially different parameters from the formation of the layer of the first composition, i.e., to provide the desired lower porosity of the second layers of the granules. In other embodiments, the layer of the second composition is formed by granulation, spray coating, fluidized bed coating, magnetically assisted impaction coating or spinning disc coating.

In other embodiments, the layer of the first composition is performed by roll compaction or extrusion. Roll compaction and extrusion methods are familiar to the person of ordinary skill in the art, and can be used to make first layers in the form of granule cores. In certain such embodiments, the layer of the second composition is formed by pan coating, fluidized bed coating, magnetically assisted impaction coating or spinning disc coating.

Additional aspects of the disclosure are provided by the following enumerated embodiments, which can be combined and permuted in any number and in any combination that is not technically or logically inconsistent.

Embodiment 1

A collection of solar-reflective roofing granules having a solar reflectivity of at least 70%, wherein substantially each roofing granule comprises an inner layer, an outer layer disposed on an outer surface of the inner layer and substantially surrounding the inner layer, wherein the inner layer and the outer layer are formed from substantially the same composition but have substantially different porosities, the outer layer having a porosity substantially lower than the porosity of the inner layer.

Embodiment 2

The collection of solar-reflective granules according to embodiment 1, wherein in substantially each roofing granule the composition of the outer layer is at least 95% common with the composition of the inner layer.

Embodiment 3

The collection of solar-reflective roofing granules according to embodiment 1, wherein in substantially each roofing granule the composition of the outer layer is at least 98°/s common with the composition of the inner layer.

Embodiment 4

The collection of solar-reflective roofing granules according to embodiment 1, wherein in substantially each roofing granule the composition of the outer layer is at least 99% common with the composition of the inner layer.

Embodiment 5

The collection of solar-reflective roofing granules according to any of embodiments 1-4, wherein in substantially each roofing granule the porosity of the inner layer is at least 10%, e.g., in the range of 10-50%.

Embodiment 6

The collection of solar-reflective roofing granules according to any of embodiments 1-4, wherein in substantially each roofing granule the porosity of the inner layer is at least 20%, e.g., in the range of 20-50%.

Embodiment 7

The collection of solar-reflective roofing granules according to any of embodiments 1-6, wherein in substantially each roofing granule the porosity of the outer later layer is less than 15%.

Embodiment 8

The collection of solar-reflective roofing granules according to any of embodiments 1-6, wherein in substantially each roofing granule the porosity of the outer later layer is less than 10%.

Embodiment 9

The collection of solar-reflective roofing granules according to any of embodiments 1-8, wherein in substantially each roofing granule the porosity of the outer layer is no more than 50%, e.g., no more than 25% of the porosity of the inner layer.

Embodiment 10

The collection of solar-reflective roofing granules according to any of embodiments 1-8, wherein in substantially each roofing granule the porosity of the outer layer is no more than 10% of the porosity of the inner layer.

Embodiment 11

The collection of solar-reflective roofing granules according to any of embodiments 1-10 (e.g., when the inner layer is configured as a granule core), wherein in substantially each roofing granule the inner layer has a thickness of at least 250 microns, e.g., at least 500 microns or at least 1 mm.

Embodiment 12

The collection of solar-reflective roofing granules according to embodiment 11, wherein in substantially each roofing granule the thickness of the inner layer is no more than 5 mm, e.g., no more than 3 mm or even no more than 2 mm.

Embodiment 13

The collection of solar-reflective roofing granules according to any of embodiments 1-10 (e.g., when the inner layer is configured as a coating on a base particle), wherein in substantially each roofing granule the inner layer has a thickness of at least 20 microns, e.g., at least 40 microns.

Embodiment 14

The collection of solar-reflective roofing granules according to embodiment 11, wherein in substantially each roofing granule the thickness of the inner layer is no more than 200 microns, e.g., no more than 150 microns or even no more than 100 microns.

Embodiment 15

The collection of solar-reflective roofing granules according to any of embodiments 1-14, wherein in substantially each roofing granule the outer layer has a thickness of at least 5 microns, e.g., at least 10 microns.

Embodiment 16

The collection of solar-reflective roofing granules according to embodiment 15, wherein in substantially each roofing granule the thickness of the outer layer is no more than 100 microns, e.g., no more than 50 microns.

Embodiment 17

The collection of solar-reflective roofing granules according to any of embodiments 1-16, wherein in substantially each roofing granule the outer layer is a discrete layer from the inner layer, having a discrete boundary therebetween.

Embodiment 18

The collection of solar-reflective roofing granules according to any of embodiments 1-17, w wherein in substantially each roofing granule the outer layer forms the outermost layer of the roofing granule.

Embodiment 19

The collection of solar-reflective roofing granules according to any of embodiments 1-17, wherein in substantially each roofing granule a coating is formed on the outer layer.

Embodiment 20

The collection of solar-reflective roofing granules according to any of embodiments 1-19, wherein at least 90% of the solar-reflective roofing granules of the collection have a particle size in the range of #5 US mesh to #50 US mesh.

Embodiment 21

The collection of solar-reflective roofing granules according to any of embodiments 1-20, wherein the collection of solar-reflective roofing granules has a solar reflectivity of at least 75%, at least 80%, or even at least 85%.

Embodiment 22

The collection of solar-reflective roofing granules according to any of embodiments 1-21, wherein the solar-reflective roofing granules of the collection are white in color, and the collection of solar-reflective roofing granules has a $(a^{+2}+b^{+2})^{1/2}$ less than 6.

Embodiment 23

The collection of solar-reflective roofing granules according to any of embodiments 1-22, wherein the solar-reflective roofing granules of the collection substantially comprise a base particle having the inner layer disposed thereon, and the outer layer disposed on the outer surface of and surrounding the inner layer.

Embodiment 24

The collection of solar-reflective roofing granules according to embodiment 23, wherein the base particles are crushed slate, slate granules, shale granules, mica granules or metal flakes.

Embodiment 25

The collection of solar-reflective roofing granules according to embodiment 23, wherein the base particle is a synthetic particle.

Embodiment 26

The collection of solar-reflective roofing granules according to any of embodiments 1-22, wherein the solar-reflective roofing granules of the collection substantially comprise the inner layer as a granule core, and the outer layer disposed as a coating on the inner layer.

Embodiment 27

The collection of solar-reflective roofing granules according to any of embodiments 1-26, wherein the composition of the inner layer comprises a binder and a solar reflective pigment, and wherein the composition of the outer layer comprises the binder and the solar reflective pigment.

Embodiment 28

The collection of solar-reflective roofing granules according to embodiment 27, wherein the binder is selected from the group consisting of metal silicates, aluminosilicates, clays, fluoropolymers, metal phosphates, silica coating binders, sol-gel coating binders, polysiloxanes, silicones, polyurethanes, and polyacrylates.

Embodiment 29

The collection of solar-reflective roofing granules according to embodiment 27 or embodiment 28, wherein the solar-reflective pigment is selected from the group consisting of titanium dioxide, calcium carbonate, zinc oxide, lithopone, zinc sulphide, white lead, glass microspheres, glass microbubbles, microvoid pigments, and synthetic polymeric opacifiers Embodiment 30

The collection of solar-reflective roofing granules according to any of embodiments 1-26, wherein the composition of the inner layer comprises an aluminosilicate clay and the composition of the outer layer comprises the aluminosilicate clay.

Embodiment 31

The collection of solar-reflective roofing granules according to any of embodiments 1-26, wherein each of the first layer and the second layer comprises sodium silicate and titanium dioxide.

Embodiment 32

A roofing product comprising
a substrate;
a bituminous material coated on the substrate, the bituminous material having a top surface: and
the collection of solar-reflective roofing granules according to any of embodiments 1-31 disposed on the top surface of the bituminous material, thereby substantially coating the bituminous material in a region thereof.

Embodiment 33

The roofing product according to embodiment 32, in the form of a roofing shingle.

Embodiment 34

The roofing product according to embodiment 32, in the form of a roofing membrane.

Embodiment 35

The roofing product according to any of embodiments 32-34, having a solar reflectivity of no less than 60%.

Embodiment 36

A method for making a collection of solar-reflective roofing granules according to any of embodiments 1-31, the method comprising, for substantially each roofing granule,
forming a layer of a first composition; and
forming a layer of a second composition disposed on an outer surface of and substantially surrounding the layer of the first composition,
wherein the second composition is substantially the same composition as the first composition; and
wherein the forming of the layer of the second composition is performed under substantially different conditions from the forming of the layer of the first composition.

Embodiment 37

The method according to embodiment 36, wherein the first composition is at least 95% common with the second composition.

Embodiment 38

The method according to embodiment 36, wherein the first composition is at least 98% common with the second composition.

Embodiment 39

The method according to embodiment 36, wherein the first composition is at least 99% common with the second composition.

Embodiment 40

The method according to embodiment 36, wherein the first composition is the same as the second composition.

Embodiment 41

The method according to any of embodiments 36-40, wherein the layer of the first composition is further treated (e.g., by drying, firing and/or curing) before disposal of the layer of the second composition thereon.

Embodiment 42

The method according to any of embodiments 36-40, wherein the layer of the first composition is not further treated before disposal of the layer of the second composition thereon.

Embodiment 43

The method according to any of embodiments 36-42, wherein after disposing the layer of the second composition on the layer of the first composition, the layer of the first composition and the layer of the second composition are further treated (e.g., by drying, firing and/or curing) to provide the inner layer and the outer layer of the roofing granules.

Embodiment 44

The method according to any of embodiments 36-42, wherein the layer of the first composition is formed by fluidized bed coating.

Embodiment 45

The method according to embodiment 44, wherein the layer of the second composition is formed by fluidized bed coating under substantially different coating parameters from the formation of the layer of the first composition.

Embodiment 46

The method according to embodiment 45, wherein the layer of the second composition is formed on the layer of the first composition in the same fluidized bed coating process.

Embodiment 47

The method according to embodiment 44, wherein the layer of the second composition is formed by pan coating, granulation, magnetically assisted impaction coating or spinning disc coating.

Embodiment 48

The method according to any of embodiments 36-42, wherein the layer of the first composition is formed by granulation.

Embodiment 49

The method according to embodiment 48, wherein the layer of the second composition is formed by granulation under substantially different parameters from the formation of the layer of the first composition.

Embodiment 50

The method according to embodiment 49, wherein the layer of the second composition is formed by pan coating, spray coating, fluidized bed coating, magnetically assisted impaction coating or spinning disc coating.

Embodiment 51

The method according to any of embodiments 36-42, wherein the layer of the first composition is formed by pan coating.

Embodiment 52

The method according to embodiment 51, wherein the layer of the second composition is formed by pan coating under substantially different parameters from the formation of the layer of the first composition.

Embodiment 53

The method according to embodiment 51, wherein the layer of the second composition is formed by granulation, fluidized bed coating, magnetically assisted impaction coating or spinning disc coating.

Embodiment 54

The method according to any of embodiments 36-42, wherein the layer of the first composition is formed by roll compaction.

Embodiment 55

The method according to any of embodiments 36-42, wherein the layer of the first composition is formed by extrusion.

Embodiment 56

The method according to embodiment 54 or embodiment 55, wherein the layer of the second composition is formed by pan coating, fluidized bed coating, magnetically assisted impaction coating or spinning disc coating.

It will be apparent to those skilled in the art that various modifications and variations can be made to the processes and devices described here without departing from the scope of the disclosure. Thus, it is intended that the present disclosure cover such modifications and variations of this invention provided they come within the scope of the appended claims and their equivalents.

What is claimed is:

1. A collection of solar-reflective roofing granules having a solar reflectivity of at least 70%, wherein substantially each roofing granule comprises an inner layer, an outer layer disposed on an outer surface of the inner layer and substantially surrounding the inner layer, wherein the inner layer and the outer layer are formed from substantially the same composition but have substantially different porosities, the outer layer having a porosity substantially lower than the porosity of the inner layer, wherein the inner layer has a porosity of at least 20%.

2. The collection of solar-reflective roofing granules according to claim 1, wherein in substantially each roofing granule the composition of the outer layer is at least 98% common with the composition of the inner layer.

3. The collection of solar-reflective roofing granules according to claim 1, wherein in substantially each roofing granule the porosity of the inner layer is in the range of 20-50%.

4. The collection of solar-reflective roofing granules according to claim 1, wherein in substantially each roofing granule the porosity of the outer layer is no more than 25% of the porosity of the inner layer.

5. The collection of solar-reflective roofing granules according to claim 1, wherein the inner layer is configured as a granule core, and wherein in substantially each roofing granule the inner layer has a thickness of at least 250 microns and no more than 5 mm.

6. The collection of solar-reflective roofing granules according to claim 1, wherein the inner layer is configured as a coating on a base particle, and wherein in substantially each roofing granule the inner layer has a thickness of at least 20 microns and no more than 200 microns.

7. The collection of solar-reflective roofing granules according to claim 1, wherein in substantially each roofing granule the outer layer has a thickness of at least 5 microns and no more than 100 microns.

8. The collection of solar-reflective roofing granules according to claim 1, wherein in substantially each roofing granule the outer layer is a discrete layer from the inner layer, having a discrete boundary therebetween.

9. The collection of solar-reflective roofing granules according to claim 1, wherein in substantially each roofing granule the outer layer forms the outermost layer of the roofing granule.

10. The collection of solar-reflective roofing granules according to claim 1, wherein in substantially each roofing granule a coating is formed on the outer layer.

11. The collection of solar-reflective roofing granules according to claim 1, wherein the collection of solar-reflective roofing granules has a solar reflectivity of at least 75%.

12. The collection of solar-reflective roofing granules according to claim 1, wherein the solar-reflective roofing granules of the collection are white in color, and the collection of solar-reflective roofing granules has a $(a*^2+b*^2)^{1/2}$ less than 6.

13. The collection of solar-reflective roofing granules according to claim 1, wherein the solar-reflective roofing granules of the collection substantially comprise a base particle having the inner layer disposed thereon, and the outer layer disposed on the outer surface of and surrounding the inner layer.

14. The collection of solar-reflective roofing granules according to claim 1, wherein the solar-reflective roofing granules of the collection substantially comprise the inner layer as a granule core, and the outer layer disposed as a coating on the inner layer.

15. The collection of solar-reflective roofing granules according to claim 1, wherein the composition of the inner layer comprises a binder and a solar reflective pigment, and wherein the composition of the outer layer comprises the binder and the solar reflective pigment.

16. The collection of solar-reflective roofing granules according to claim 15, wherein in substantially each roofing granule the porosity of the outer later layer is less than 10%.

17. The collection of solar-reflective roofing granules according to claim 15, wherein the binder is selected from the group consisting of metal silicates, aluminosilicates, clays, fluoropolymers, metal phosphates, silica coating binders, sol-gel coating binders, polysiloxanes, silicones, polyurethanes, and polyacrylates, and wherein the solar-reflective pigment is selected from the group consisting of titanium dioxide, calcium carbonate, zinc oxide, lithopone, zinc sulphide, white lead, glass microspheres, glass microbubbles, microvoid pigments, and synthetic polymeric opacifiers.

18. The collection of solar-reflective roofing granules according to claim 1, wherein the composition of the inner layer comprises an aluminosilicate clay and the composition of the outer layer comprises the aluminosilicate clay.

19. The collection of solar-reflective roofing granules according to claim 1, wherein each of the first layer and the second layer comprises sodium silicate and titanium dioxide.

20. The collection of solar-reflective roofing granules according to claim 1, wherein in substantially each roofing granule the composition of the outer layer is at least 95% common with the composition of the inner layer.

21. A roofing product comprising
a substrate;
a bituminous material coated on the substrate, the bituminous material having a top surface; and
the collection of solar-reflective roofing granules according to claim 1 disposed on the top surface of the bituminous material, thereby substantially coating the bituminous material in a region thereof.

22. The roofing product according to claim 21, having a solar reflectivity of no less than 60%.

23. A method for making a collection of solar-reflective roofing granules according to claim 1, the method comprising, for substantially each roofing granule,
forming a layer of a first composition; and
forming a layer of a second composition disposed on an outer surface of and substantially surrounding the layer of the first composition,
wherein the second composition is substantially the same composition as the first composition, and
wherein the forming of the layer of the second composition is performed under substantially different conditions from the forming of the layer of the first composition.

* * * * *